United States Patent [19]

Yada

[11] 4,253,902

[45] Mar. 3, 1981

[54] AUTOMATIC LABELER

[75] Inventor: Kazuaki Yada, Tokyo, Japan

[73] Assignee: Sansei Seiki Co., Ltd., Tokyo, Japan

[21] Appl. No.: 162,564

[22] Filed: Jun. 24, 1980

[51] Int. Cl.[3] .............................................. B32B 31/00

[52] U.S. Cl. .................................... 156/361; 156/542; 156/566; 156/584

[58] Field of Search ................................ 156/540–542, 156/566–568, 584, 344, 361, 362, 363

[56] References Cited

U.S. PATENT DOCUMENTS

| | | | |
|---|---|---|---|
| 2,764,408 | 9/1956 | Weiler | 156/568 X |
| 3,938,698 | 2/1976 | McDavid et al. | 156/541 X |
| 3,992,244 | 11/1976 | Craig et al. | 156/584 X |

FOREIGN PATENT DOCUMENTS

| | | | |
|---|---|---|---|
| 940208 | 10/1963 | United Kingdom | 156/542 |

*Primary Examiner*—David A. Simmons
*Attorney, Agent, or Firm*—Jordan and Hamburg

[57] ABSTRACT

An automatic labeler comprising (1) a label peeling-applying unit including a rotary drum provided at its periphery with at least one label-sucking slit, (2) a mounted label feeding unit including a support plate provided at its forward end with a peeling means such as a peeling blade or a guide pin and (3) a conveyor for conveying articles to be labeled, characterized in that a mounted label is bent at the peeling means to peel the tip of the label from the mount, the peeled tip of the label is sucked to the label-sucking slit of the rotary drum while the label-free mount is held at the peeling means provided on the support plate, the rotary drum and support plate are rotated at the same peripheral velocity in the same direction to complete peeling of the label from the mount simultaneously with attraction of the peeled label to the sucking slit under vacuum, and the label so attracted is then applied to an article on the conveyor while the vacuum is released and the rotary drum and conveyor are moved at the same velocity in the same direction.

4 Claims, 4 Drawing Figures

AUTOMATIC LABELER

Figure 1:
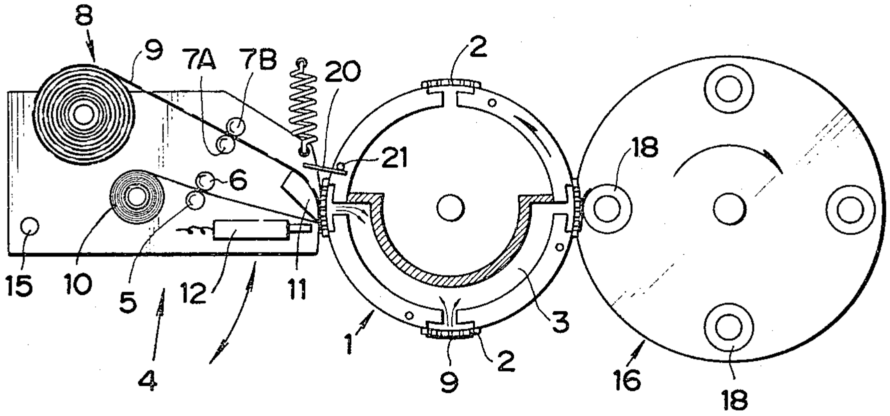

This invention relates to an automatic labeler or an apparatus for automatically applying a label to an article such as a container and more particularly it relates to an automatic labeler comprising a unit for feeding labels mounted on a tape-like mount, a unit for peeling the labels from the mount and applying the peeled labels to articles such as containers, and a unit for conveying the articles.

Conventional labeling methods comprise bending a mounted adhesive-coated label at an acute angle to peel from the mount a part of the label extending beyond the bending point, maintaining the thus partially peeled mounted label stationary, contacting the adhesive-coated surface of the stationary peeled label part with the surface of a moving container carried on a conveyor and peeling the remaining part of the label progressively from the mount while applying the peeled label progressively to the container thereby to complete the application of the label to the container, or they comprise peeling the label entirely from the mount, sucking the peeled label onto a receiver with aid of vacuum and then blowing the label from the receiver to the container when the container is carried to the labeling position, thereby to complete the application of the label to the container. However, since in the conventional labelers the label in the stationary state is applied to the container in the continuously moving state, there is a tendency that the label is not applied exactly to a container portion to which it is desired to be applied and, therefore, it is extremely difficult to apply the label exactly to the desired portion of the container without any positional discrepancy. As is seen from the above, the conventional labelers lack accuracy, reliability and efficiency in the practice of labeling. Further, because of their such mechanism, the conventional labelers are not practically applicable to the application of the label to a container having a curved surface and to the application of a small-sized label even to a container having a flat surface.

The primary object of this invention is to provide a novel labeler which eliminates the disadvantages of the conventional labelers and is capable of applying a label reliably and exactly to the desired portion of a container.

The automatic labelers of this invention comprise (1) a label peeling-applying unit including a rotary drum provided on its periphery with at least one label sucking slit, the rotary drum being capable of applying vacuum through the slit when the rotary drum receives the label at the slit and also capable of releasing the vacuum when the label so received is applied to a container or the like, (2) a unit for feeding mounted labels including a support plate the forward end of which begins to arcuately move when the tip of the label is sucked onto the label-sucking slit of the rotary drum, continues to move at the same velocity as the peripheral velocity of the rotary drum over such a distance as to peel the label entirely from the mount and then returns to the original position, the support plate being provided on the surface with a means (such as guide rolls) for passing mounted labels towards the forward end of the support plate, a peeling means (such as a peeling blade or guide pin) at which the mounted label is bent to separate the tip of the label from the mount, a means (such as a driving roll and a mating roll) for passing the label-separated mount to a take-up reel, and a photoelectric detector to stop the driving roll for a certain time and (3) a unit for conveying an article such as a container, to contact a desired portion thereof with the label sucked by the rotary drum thereby ensuring the application of the label to the desired portion of the article.

As is mentioned above, the labeler of this invention comprises the three specified units.

The label the tip of which has been peeled from the mount by bending at the peeling means (that is, the partially peeled label), stands still to wait for the label-sucking slit of the rotary drum to come near the label tip under the control of the photoelectric detector. When the sucking slit of the rotary drum comes near the label tip and sucks it thereonto, the partially peeled label and the sucking slit will begin their movement at the same velocity in the same direction to smoothly peel the label entirely from the mount while the whole of the label is sucked onto the sucking slit. Furthermore, the application of the label to the container or the like may be effected safely and exactly owing to the fact that they move at the same velocity in the same direction for contact with each other.

Figure 2:
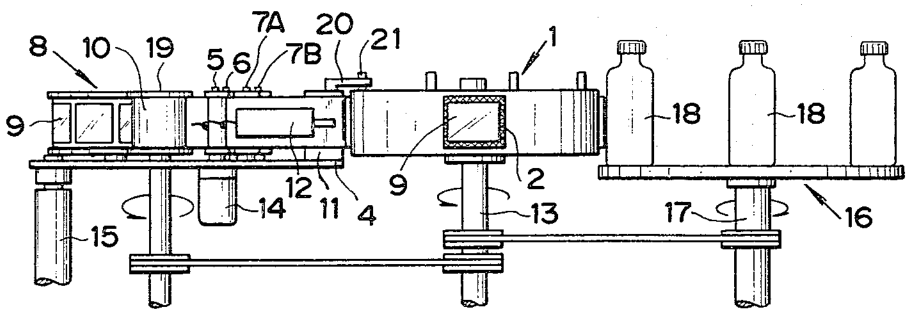
Figure 3:
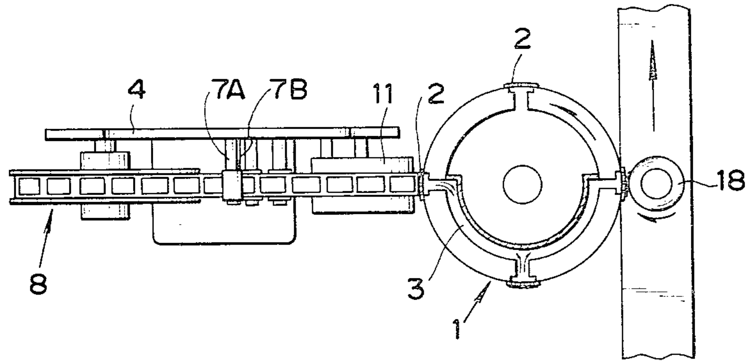
Figure 4:
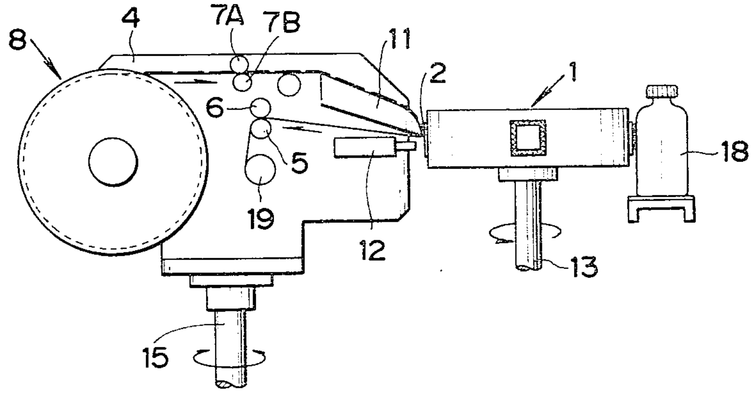

This invention will be explained in more detail be reference to the accompanying drawings in which:

FIG. 1 is a plan showing the outline of the labeler embodying this invention, FIG. 2 is a side view of the labeler of FIG. 1, FIG. 3 is another embodiment of the labeler of this invention and FIG. 4 is a side view of the labeler of FIG. 3.

Referring now to the Figures, numeral 1 indicates a rotary drum and numeral 2 a sucking slit. The rotary drum houses a pressure-reduced or vacuum chamber 3 extending over about one-fourth or a half of the periphery of the rotary drum as shown in FIG. 1, the vacuum being obtained by the use of a vacuum pump for example. The vacuum chamber 3 is so fixed that it stands still irrespective of the rotation of the rotary drum. The vacuum chamber is provided, on its side facing the drum wall, with a slit-like opening communicating with the label sucking slit 2. The vacuum chamber extends within the rotary drum from the point where the label sucking slit of the rotary drum begins to suck the label to the point where the application of said label to a container or the like is completed. It is preferable that the label sucking slit be in the form of a net or grate to prevent labels from being sucked thereinto.

A support plate 4 in a unit for feeding mounted labels is provided on the surface with a driving roll 5 and mating roll 6 for passing the label-free mount to a take-up reel 19 and guide rolls 7A, 7B for passing the mounted labels towards a peeling blade 11, these four rolls and one reel in combination being useful in feeding mounted labels from a feeding reel 8 towards the peeling blade at the forward end of the support plate and in recovering the label-free mount to the take-up reel 19. Numeral 10 indicates a tape-like mount. The mounted labels (the labels 9 mounted on the tape-like mount 10) from the reel 8 are passed to the peeling blade 11 where they are bent at the blade to separate the tip of the label easily from the mount and only the label-free mount is passed through between the rolls 5 and 6 to the take-up reel 19. A photoelectric detector 12 detects that the tip of the label 9 has been peeled from the mount 10 at the peeling blade 11 by emitting light from the detector to the peeled tip of the label and receiving light reflected therefrom, whereupon the driving roll 5 is stopped. As soon as the label has been completely peeled from the mount by being sucked onto the sucking slit 2 of the rotary drum 1 while the support plate and the rotary drum are rotated at the same velocity in the same direction, the driving roll 5 automatically resumes its rotation to repeat such an operation as above. As shown in FIG. 2, the rotary drum 1, the support plate 4, the driving roll 5 and a conveyor 16 may be driven for rotation by using separate motors respectively. In a case where the driving roll 5 is not driven by a separate motor, it may be rotated by means of connecting a pulley fitted on the rotation axis 13 of the rotary drum to a pulley fitted on the rotation axis 14 of the driving roll 5 by the use of an elastic belt hung around these pulleys and an electromagnetic clutch (not shown) engageable or releasable by the signal from the photoelectric detector. In a case where the support plate 4 is not driven by a separate motor, it may be rotated by connecting the rotation axis 14 of the driving roll 5 to the rotation axis 15 of the support plate 4 with a belt, a gear or the like.

Numeral 15 indicates the pivot of the support plate 4. The pivot 15 is the rotation axis of the support plate. The support plate may be pivotally rotated to enable the partically peeled label (the label having its tip peeled by bending at the peeling blade) to make an arcuate movement for further peeling. The support plate 4 may be pivotally rotated by, for example, a driving motor fitted thereto or by the combined use of a bar 20 provided on the forward end of the support plate 4 and a pin 21 provided near the sucking slit 2 of the rotary drum 1 whereby the forward end of the plate 4 and the periphery of the drum 1 may be moved at the same velocity in the same direction over a fixed distance as will be sun particularly from FIG. 1. FIG. 1 and 2 illustrate the pin and bar provided on the upper surfaces of the rotary drum and support plate respectively, however, they may of course be provided on the lower surfaces thereof respectively. The combination of the pin and bar makes it possible to transmit the driving power of the rotary drum to the foward end of the support plate. After the forward end of the support plate 4 has been arcuately moved at the same velocity as the peripheral velocity of the rotary drum over the fixed distance, it is returned to its original position for the subsequent peeling of the tip of a new label from the tape-like mount. To this end, the pivot of the support plate 4 may be provided with a spring or electromagnet.

The rotary drum 1 may also be rotated by transmitting a necessary power thereto from the power source of a conveyor unit, or else it may be rotated by a separate driving motor as previously mentioned. The driving power source for rotating each of the aforesaid rotatable units is not limited to said power sources, and these units may be rotated by the utilization of usual power transmitting means. Numeral 16 indicates a conveyor, such as a star wheel (turn table type conveyor), and containers or the like 18 are positioned on the conveyor so that a desired portion of the articles 18 comes into contact with the label-sucking slit 2 of the rotary drum 1.

Unlike the conventional labelers, the automatic labelers of the present invention are characterized by the specified manner of feeding labels and the specified manner of applying the labels to containers or the like; more particularly, the rotary drum and the support plate move at the same peripheral velocity in the same direction to separate the labels from the tape-like mount on which they are mounted and, furthermore, the rotary drum and the conveyor also move in the same manner as above to apply the labels to the containers or the like. Thus, the present invention is advantageous in that the labels are applied exactly to the desired portions of containers or the like without causing creases, swells and the like in the applied labels, thereby to ensure safe and exact labeling with a high efficiency. For example, the sucking slit 2 of the rotary drum 1 approaches the tip of the label 9 peeled from the mount 10 and vacuum is exerted through the sucking slit 2 soon before, or simultaneously with, contact of the slit with the tip of the label, whereby the slit sucks or attracts the said label tip thereonto. At this time, the rotation torque of the rotary drum 1 is transmitted to the forward end of the support plate 4 by pushing the bar 20 with the pin 21 whereby the drum 1 and plate 4 are rotated at the same velocity in the same direction. By this rotation, the remaining portion of the label still mounted is gradually separated into the label portion and the mount portion, and the whole of the label is neatly sucked onto the sucking slit.

Likewise, the label so sucked is then released from the sucking slit simultaneously with being applied to the container or the like while the label on the rotary drum and the container or the like on the conveyor are moved at the same velocity in the same direction.

As is seen from the foregoing, the automatic labelers of this invention have novel mechanisms which the conventional labelers have never had, and these novel mechanisms make it possible to apply labels to desired surface portions of articles safely and exactly with a high efficiency.

What is claimed is:

1. An automatic labeler comprising:

(1) a label peeling-applying unit including a rotary drum having at least one label-sucking slit at the periphery thereof, vacuum being applied to the label-sucking slit when it receives a label from a mounted label feeding reel and the vacuum being released from the label-sucking slit when the thus received label is applied to an article, (2) a mounted label feeding unit including (i) a support plate provided at its forward end with (ii) a peeling means at which a mounted label from the mounted label feeding reel is bent to peel the tip of the label from the mount, the support plate being capable of being pivotally rotated so that the forward end thereof may, after sucking of the tip of the label onto the sucking slit of the rotary drum, arcuately move at the same peripheral velocity in the same direction as the rotary drum over such a distance as to peel the whole of the label from the mount and soon thereafter it may return to its original position for repeating the same peeling operation as above, (iii) a means for passing mounted labels towards the forward end of the support plate, (iv) a means for passing the label-peeled mount to a take-up reel and (v) a photoelectric detector sending a signal to stop the driving roll for a time required to peel the whole of the label from the mount, the signal being sent when the photoelectric detector detects the peeling of the tip of the label from the mount by bending the mounted label at the peeling blade, and (3) a conveyor unit so positioned that the label sucked onto the label-sucking slit of the rotary drum may contact with a to-be-labeled article on the conveyor to apply said label to the article while the label and the article are moving at the same velocity in the same direction, thereby ensuring satisfactory labeling without causing creases and swells in the applied label.

2. An automatic labeler according to claim 1, wherein the peeling means is a peeling blade or a guide pin.

3. An automatic labeler according to claim 1 or 2, wherein the means (iii) consists of guide rolls between which the mounted labels are passed.

4. An automatic labeler according to claim 3, wherein the means (iv) consists of a driving roll and a mating roll between which the label-peeled mount is passed.

* * * * *